Dec. 6, 1966     P. K. SHRECK     3,289,325
EDUCATIONAL DEVICE

Filed Aug. 31, 1964     3 Sheets-Sheet 1

Inventor:
Peter K. Shreck

Dec. 6, 1966  P. K. SHRECK  3,289,325
EDUCATIONAL DEVICE
Filed Aug. 31, 1964  3 Sheets-Sheet 2
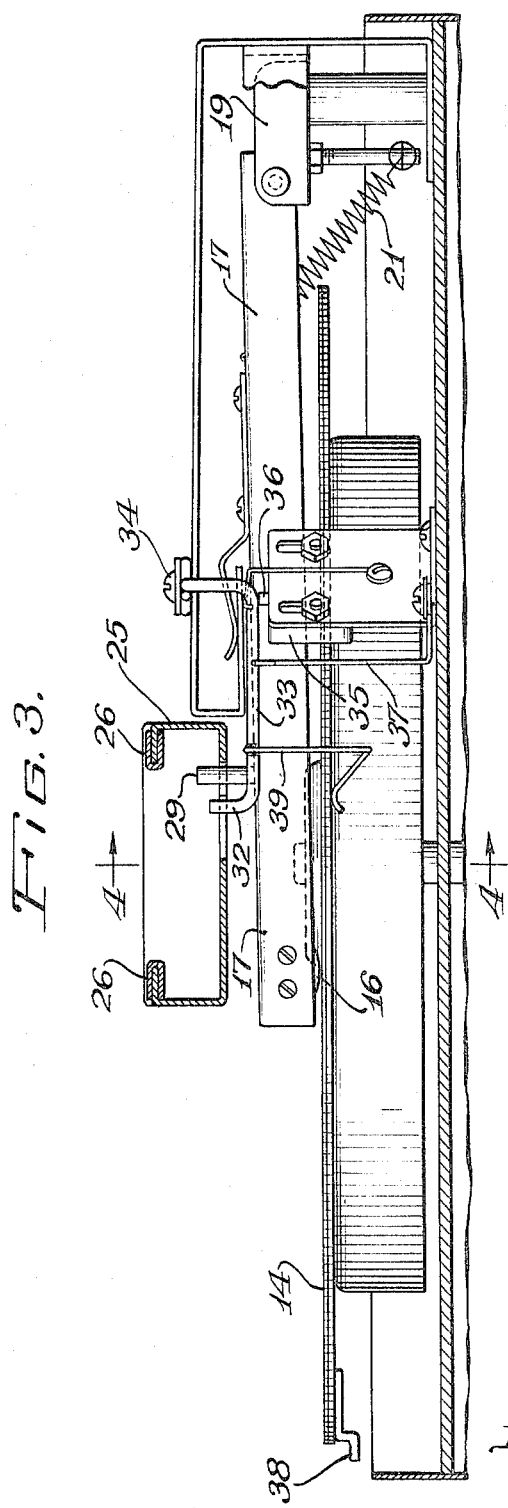
Inventor:
Peter K. Shreck
By Hair Freeman & Molinare
Attys.

Dec. 6, 1966 P. K. SHRECK 3,289,325
EDUCATIONAL DEVICE
Filed Aug. 31, 1964 3 Sheets-Sheet 3

Inventor:
Peter K. Shreck
By Bair, Freeman & Molinare
Attys.

United States Patent Office 3,289,325
Patented Dec. 6, 1966

3,289,325
EDUCATIONAL DEVICE
Peter K. Shreck, 555 Cornelia Ave., Chicago, Ill.
Filed Aug. 31, 1964, Ser. No. 393,093
14 Claims. (Cl. 35—35)

This invention relates to educational devices and more particularly to a device for selectively producing sounds corresponding or related to selected characters or symbols.

In teaching pronunciation or speech it becomes desirable to provide a means which will produce sounds corresponding or related to selected characters or symbols. For example, in teaching transmission of the alphabet or words or phrases either in the student's native language or a foreign language, such a device should permit the selection of any character or symbol in the nature of a letter, word or phrase and should audibly produce the sound thereof. Alternatively the device should produce sounds corresponding to pictures or similar representations, such as the sounds produced by various animals, birds, or the like. Such pictures, as well as letters, words, phrases and the like, are herein generically referred to as "characters."

Various devices have heretofore been proposed for this general purpose, but are all subject to deficiencies of one sort or another. Most of the prior art devices are so complicated in construction or in the operation necessary to select the desired character, or in both, that they are not practical for use. Furthermore, in many cases the scope of use of the device is limited in that the audible recordings are difficult or impossible to change or are incapable of producing audible sounds of sufficient duration to have any but very restricted utility.

It is accordingly an object of the present invention to provide an educational device for producing sounds corresponding to selected characters which provides a wide range of sound recordings in each group, in which the sound recording is easily changed, in which selection of the desired characters is made easily and quickly and in which individual sound recordings have sufficient duration to satisfy a wide range of subjects.

Another object is to provide an educational device in which the characters are displayed on indivdual character blocks which are inserted into the apparatus and whose mere insertion effects selection of the corresponding recording.

According to a feature of the invention, insertion of a character block into the apparatus initiates operation thereof to produce an audible reproduction of the selected recording. Preferably the operation is stopped after one complete cycle in which the selected recording is completely reproduced.

The above and other objects and features of the invention will be more readily apparent from the following description when read in connection with the accompanying drawings, in which:

FIG. 3 is an enlarged end view;

FIGS. 4 and 5 are partial sections on the line 4—4 of FIG. 3 showing the apparatus in different conditions;

Figure 1:
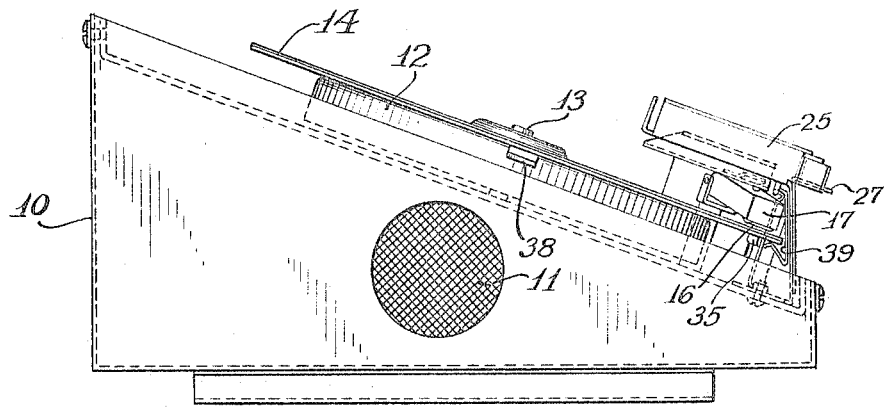
FIG. 1 is a side elevation of an educational device embodying the invention.

The complete apparatus, as shown in FIG. 1, comprises a casing or housing, indicated generally at 10, in which the sound amplifying and reproducing apparatus may be housed and which may also contain a driving motor for driving the sound recording. As shown, the housing contains a speaker which is mounted behind a grilled opening 11 in one side of the casing, although, of course, the speaker could be located at any desired position.

Figure 2:
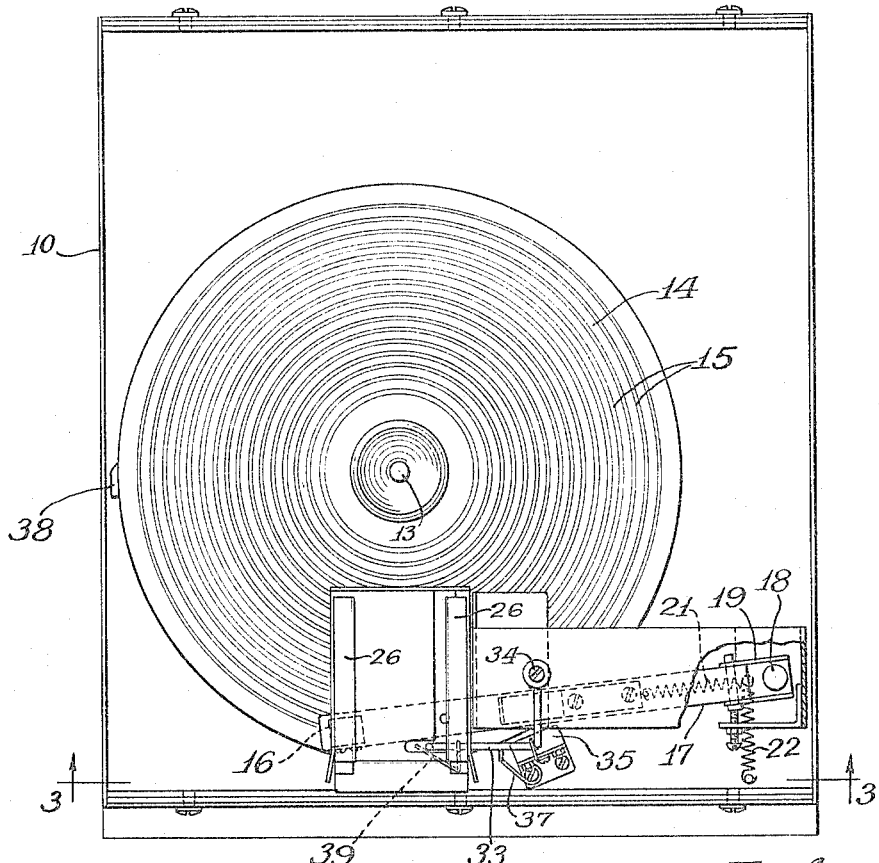
FIG. 2 is a top plan view.
Figure 6:
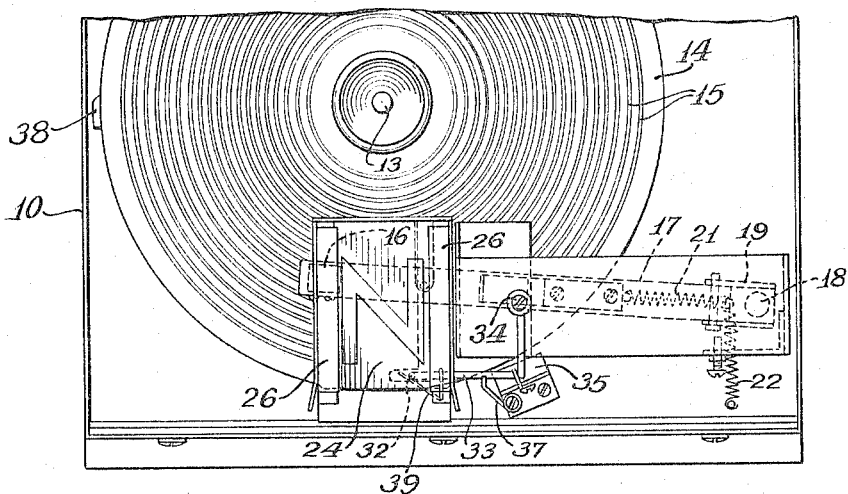
FIG. 6 is a partial top plan view showing a character block inserted.

On the upper face of the housing which is preferably sloping, as shown, a turntable 12 is mounted for rotation on a supporting and driving shaft 13 which may be driven by an electric motor in the casing, not shown. The turntable is adapted to receive and support a disc recording 14 which may be either a conventional grooved phonograph disc or a magnetic disc having the desired sounds magnetically recorded thereon. Preferably, as indicated in FIG. 2, the recordings whether in the form of grooves in the disc or magnetic records on the disc, are in the form of annular continuous sound tracks 15, as distinguished from a spiral sound track.

The recorded material is adapted to be reproduced through a pickup 16 mounted at one end to a pickup supporting arm 17 which is supported at its opposite end on the housing for pivotal movement about a vertical axis 18. In the case of a grooved disc record, the pickup may be a needle and transducer cartridge, while in the case of a magnetic recording, the pickup may be a magnetic pickup which is movable over the disc either in contact therewith or in closely spaced relationship thereto. Preferably the pickup arm is pivoted on a yoke 19 on a horizontal axis so that the pickup arm may be moved vertically and a spring 21 may be provided to hold the pickup arm down against the recording, but in a manner such that it can yield to any irregularities in the disc to follow the disc closely. A second spring 22 connected to the pickup arm tends to turn it counterclockwise, as seen in FIG. 2, so that it will normally lie adjacent to the periphery of the disc, as shown. It will be understood that the pickup 16 is connected through suitable wiring extending through the arm 17 to an amplifier in the casing which drives the speaker for producing an audible reproduction of the recording on the disc.

Figure 7:
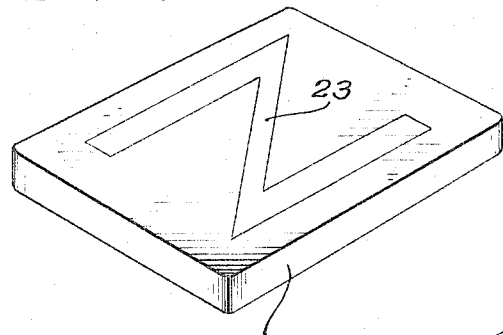
FIGS. 7 and 8 are perspective views on opposite sides of a character block.

The recording which is to be reproduced will correspond to a character, as shown at 23, which is displaced on the upper face of a character block 24, as illustrated in FIG. 7. The character blocks 24, each of which may carry a different character are preferably formed of a relatively strong material such as molded plastic and the characters carried thereby may be produced thereon by any desired means. Each character block is adapted to be received in a recess formed in the apparatus so that individual character blocks can be selected and can be readily inserted and removed to cause reproduction of audible sounds corresponding or related to the character displayed on the selected character block.

Figure 8:
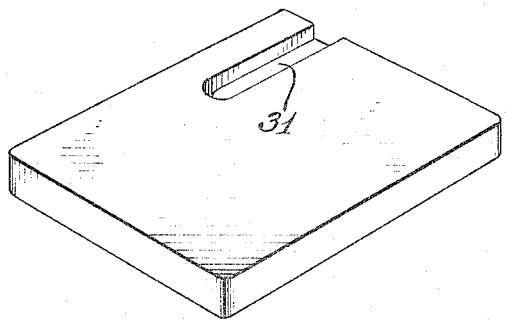

As best seen in FIGS. 3, 4 and 5, the recess for receiving the character block is defined by a channel-shaped strip 25 having slotted openings in its bottom for a purpose to appear later and having inwardly turned flanges 26 at its upper edges beneath which the upper edge portions of the character block may be inserted. At the front face of the housing the channel section is open to receive a character block and is preferably provided with a horizontally extending guide flange 27 which lies at a level slightly above the bottom of the channel strip 25. At its opposite end the recess is closed by an upwardly extending flange 28 which will limit insertion of a character block in the recess. The pickup arm 17 carries an upwardly extending pin 29 which projects upwardly through a slot in the bottom of the channel member 25 into the recess, as clearly shown in FIGS. 3, 4 and 5. Each of the character blocks, as shown in FIG. 8, is formed in its undersurface with a groove 31 which is positioned to receive the upper end of the pin 29. The length of the groove in each of the character blocks is made different so that when a character block is inserted in the recess the end of the groove 31 will engage the pin 29 and swing the pickup arm radially of the disc to a position registering with the recording on the disc which corresponds to the character displayed on the character block.

A second pin 32 extends upwardly through an opening in the bottom of the channel member 25 adjacent to the open inlet end thereof. As best seen in FIG. 3, the pin 32 is formed by the upturned end of a rod or wire 33 which is mounted on top of the casing through an eyelet and screw 34. The rod or wire 33 extends generally horizontally and is resilient so that it can be pressed down but will spring up again to its initial position.

A switch 35 is mounted on the casing with an operating button 36 thereon underlying and engaging a portion of the wire or rod 33 so that when the wire or rod 33 is sprung downwardly, it will close the switch 36. The switch 36 is connected in circuit with the motor which drives the shaft 13 so that whenever the switch is closed the motor will be energized to turn the turntable and disc.

The wire or rod 33 is adapted to be held in its lowered position by a latch device comprising a hook portion on top of a resilient wire 37 extending along side the wire or rod 33 and rigidly secured at its lower end to the base of the housing. When the wire or rod 33 is pressed downwardly, the hook portion at the upper end of the wire 37 will hook over it due to the bias in the wire 37 and will hold it in its lowered position.

In order to stop operation of the apparatus after one complete revolution or cycle the turntable carries a projecting cam 38 at one side thereof, as shown in FIG. 2. The turntable will normally occupy a position of rest in which the cam or projection 38 is just to the left of the latch wire 37, as seen in FIG. 2. Therefore, when the wire or rod 33 is depressed and latched down to close the switch 35, the turntable will turn through a complete revolution until the cam projection 38 strikes the latch wire 37 and causes it to release the rod 33 which will then spring upward to allow the switch 35 to open and stop the turntable driving motor. Rotation of the turntable is arrested quickly by means of a brake in the form of a wire 39 which is secured to the rod 33 and whose end extends under the peripheral portion of the turntable. When the rod 33 springs upward the end of the brake wire 39 will engage the bottom of the turntable and will bring it quickly to rest.

The amplifier is also controlled through the switch 35 to be energized only when the turntable driving motor is energized.

In operation of the apparatus with a selected recording disc placed on the turntable and with character blocks displaying characters corresponding to the several recordings which are located at radially spaced positions on the disc the apparatus may be connected to a source of electric power to condition it for operation. At this time, a selected character block may be inserted in the recess defined by the channel member 25 with its upper edges held down by the flanges 26. As the character block is inserted the end of the groove 31 therein will engage the pin 29 and swing the pickup arm 17 to a position in which the pickup registers with the annular recording corresponding or related to the character displayed on the character block. When the character block is completely inserted in the recess, as shown in FIG. 5, its trailing edge will drop over the flange 27 and will depress the pin 32 to swing the rod 33 downwardy. At this time the switch 35 will be closed to energize the turntable driving motor so that the turntable will start to rotate. The pickup 16 will therefore traverse the annular recording on the disc with which it is in registration and will cause an audible reproduction thereof. At the end of a complete revolution or reproduction cycle the cam 38 on the turntable will release the latch wire 37 allowing the rod 32 to spring upwardly and open the switch 35. It will be apparent, of course, that the character block could be pulled down as desired to cause one or more repetitions of the reproduction. However, unless the character block is held down the springing upwardly of the rod 33 will cause the pin 33 to elevate the character block so that its edge will pass over the flange 27 and due to the slope of the channel shaped recess 25 the character block will slide at least part way out of the recess to indicate that the audible recording is completed.

To change groups of recordings it is necessary only to remove the disc 14 which is on the apparatus and to substitute therefor a similar disc having a different group of recordings thereon. It will be understood, of course, that there are sets of character blocks corresponding to each disc so that the characters displayed on the blocks will correspond or be correctly related to the audible signals which are reproduced when a selected character block is inserted in the apparatus. It will also be seen that the apparatus of the present invention is highly flexible in that any desired type of recordings and character blocks may be used therewith for different types of audible instruction substantially without limitation. In this connection the annular recordings on the discs may encompass substantially the entire circular track on the selected part of the disc and the disc may be turned at a sufficiently low speed, particularly in the case of magnetic recordings, so that words or even whole phrases can easily be recorded and reproduced.

While one embodiment of the invention has been shown and described herein it will be understood that it is illustrative only and not to be taken as a definition of the scope of the invention, reference being had for this purpose to the appended claims.

What is claimed is:

1. An educational device comprising a record having a plurality of recordings of different sounds thereon at respectively different positions, a pickup mounted for movement relative to the record into operative relationship with any selected one of the recordings, means defining a recess to receive any one of a plurality of different character blocks, a part connected to the pickup to move it and extending into the recess to be engaged and moved by a keying portion on a character block inserted into the recess, and a plurality of character blocks insertable into the recess, each displaying a different indicia and each having a keying portion thereon to move the pickup into operative relationship with the recording corresponding to said indicia.

2. The educational device of claim 1 including a motor to drive the record and a control switch for the motor operated by a character block when it is inserted fully into the recess.

3. The educational device of claim 2 including means operated by movement of the record through a complete cycle sufficient to reproduce a full individual recording to operate the switch to stop the motor.

4. An education device comprising a record, means to drive the record in a predetermined path, the record having a plurality of recordings thereon each extending longitudinally of the path and with the different recordings spaced laterally of the path, a pickup mounted for movement laterally of the path into selective registration with the recordings, means defining a recess to receive a character block, a plurality of character blocks to be selectively received in the recess each displaying a different character and each having a keying portion thereon, and means for moving the pickup including a part extending into the recess to be engaged and moved by the keying portion of a block inserted in the recess.

5. The educational device of claim 4 including control means for the drive means, a part projecting into the recess to be engaged by a block fully inserted in the recess to operate the control means thereby to energize the drive means, and means operated by movement of the record through a full cycle to operate the control means to de-energize the drive means.

6. The educational device of claim 5 in which the control means is biased to motor de-energizing condition, a latch is provided to hold the control means in motor energizing condition, and the last named means includes a part movable with the record to engage and release the latch.

7. An educational device comprising a record having a plurality of spaced parallel endless recording tracks thereon, a pickup mounted for movement across the tracks into selective registration with the tracks, drive means to move the record and pickup relative to each other in a direction along the tracks thereby to reproduce the recording on the track with which the pickup registers, means defining a recess, a plurality of character blocks selectively insertable in the recess, means including a part projecting into the recess to move the pickup across the tracks, each of the character blocks having means thereon engageable with said part to move the pickup into registration with the track corresponding to that character block.

8. The educational device of claim 7 including control means for the drive means operable by insertion of a character block fully into the recess to energize the drive means.

9. The education device of claim 8 including means movable with the record to operate the control means to de-energize the drive means after a full cycle during which the pickup has fully traversed one of the tracks.

10. An educational device comprising a turntable, a driving motor for the turntable, a disc record on the turntable having recordings thereon in radially spaced sound tracks, a pickup mounted for movement radially of the turntable and record into selective registration with different portions of the sound tracks, means defining a recess to receive a character block, a plurality of character blocks selectively receivable in the recess, means including a part projecting into the recess to move the pickup radially across the record, each of the character blocks having a keying portion thereon engageable with said part to move the pickup to a position registering with the sound track portion corresponding to the character on the character block, and control means for the driving motor.

11. The educational device of claim 10 in which the control means includes a part projecting into the recess and engaged and moved by a character block when it is inserted fully into the recess.

12. The educational device of claim 11 including a cam part on the turntable to operate the control device to de-energize the driving motor after one complete revolution of the turntable.

13. An educational device comprising a turntable, a driving motor for the turntable, a disc record on the turntable having recordings thereon in radially spaced sound tracks, a pickup mounted for movement radially of the turntable and record into selective registration with different portions of the sound tracks, means defining a recess to receive a character block, a plurality of character blocks selectively receivable in the recess, means including a part projecting into the recess to move the pickup radially across the record, each of the character blocks having a groove of predetermined length therein into which said part is received whereby when a character block is inserted in the recess it will move the pickup to a position registering with the sound track portion corresponding to the character on the character block, and control means for the driving motor including a part projecting into the recess to be engaged and operated by a character block when it is inserted fully into the recess.

14. The educational device of claim 13 including a latch to hold the control means in operated condition to energize the driving motor, and a cam part on the turntable to engage and release the latch after a single revolution of the turntable thereby to de-energize the driving motor.

References Cited by the Examiner

UNITED STATES PATENTS

| | | | |
|---|---|---|---|
| 1,930,286 | 10/1933 | Runyan | 35—35.3 X |
| 2,973,588 | 3/1961 | Monzingo | 35—35.3 |
| 3,086,297 | 4/1963 | Kantrowitz | 35—35.3 |

FOREIGN PATENTS 299,334   10/1928   Great Britain.

EUGENE R. CAPOZIO, *Primary Examiner.*

W. GRIEB, *Assistant Examiner.*